W. E. GIESECKE.
LEACHING TANK.
APPLICATION FILED MAR. 31, 1917.
1,330,463.
Patented Feb. 10, 1920.
2 SHEETS—SHEET 2.
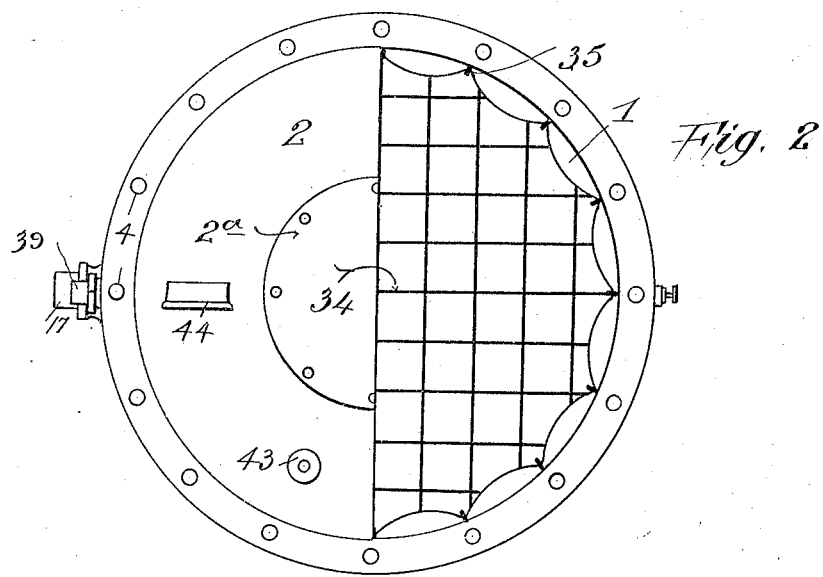
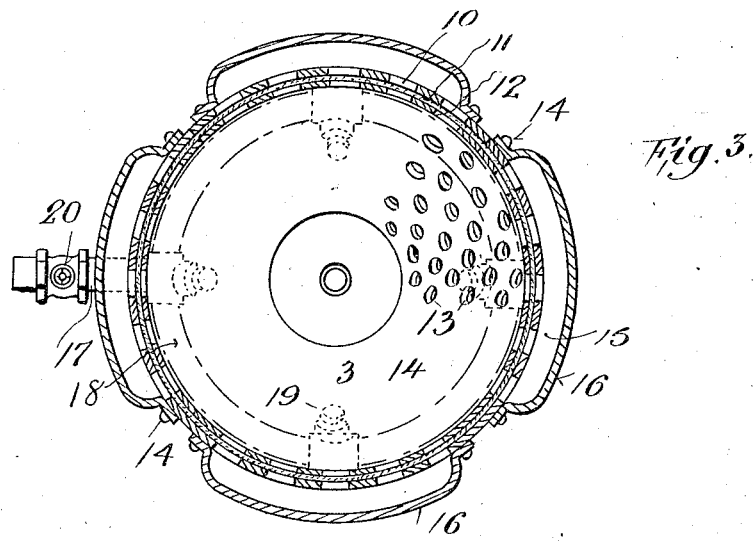
Inventor
W. E. Giesecke.
by his Atty. T. F. Bourne

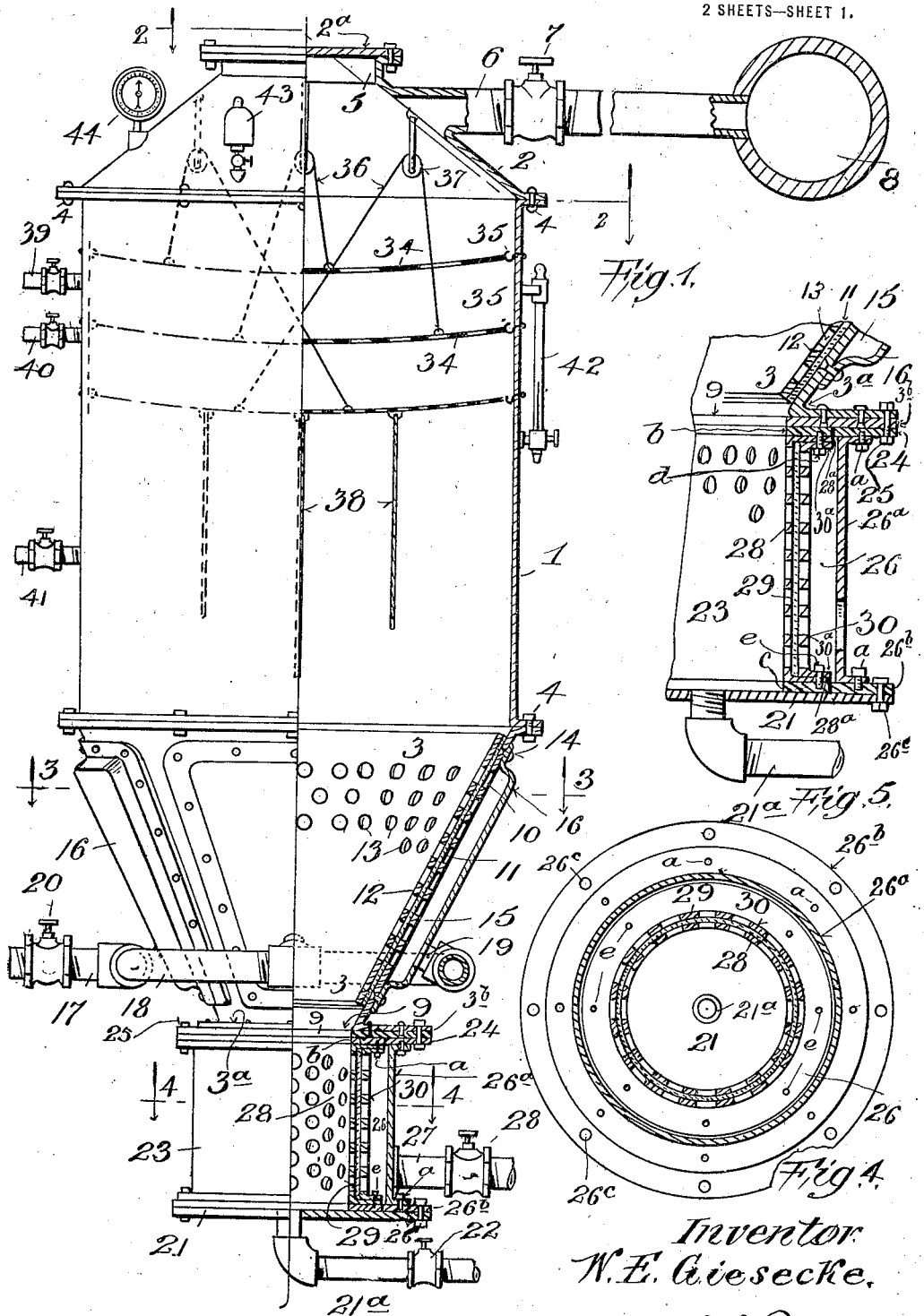

UNITED STATES PATENT OFFICE.

WILLIAM E. GIESECKE, OF NEW YORK, N. Y., ASSIGNOR TO RAY BROS. CORPORATION, OF NEW YORK, N. Y., A CORPORATION OF NEW YORK.

LEACHING-TANK.

1,330,463.

Specification of Letters Patent. Patented Feb. 10, 1920.

Application filed March 31, 1917. Serial No. 158,946.

*To all whom it may concern:*

Be it known that I, WILLIAM E. GIESECKE, a citizen of the United States, and resident of New York city, borough of Manhattan, in the county of New York and State of New York, have invented certain new and useful Improvements in Leaching-Tanks, of which the following is a specification.

The object of my invention is to provide a new and improved tank or vessel adapted for the leaching of suitable raw materials, and the filtration of the solution so obtained through settled raw material in the tank, as well as to provide means for agitation of a charge in the tank by blowing fluid through such charge, and to provide means to force or draw through such filter medium, by fluid pressure or vacuum, solution remaining in such filter medium.

Another object of my invention is to provide inclosed filtering means at the bottom of the tank through which solution may be drawn from the tank and through which fluid may be forced to cause agitation of the charge in the tank and for the supply of leaching agent to the tank.

Another object of my invention is to provide a removable filtering chamber at the bottom of the tank in communication therewith, in which coarse disintegrated raw material may be retained as a filter medium, below other such raw material in the tank, or in which sand or gravel, or other appropriate material, may be charged to act as a filter medium, below the disintegrated raw material, or in which chamber both disintegrated raw material and sand or gravel may be retained to act as a filter medium.

A further object is to provide means to temporarily retain raw material of relatively large sized lumps mechanically suspended in the tank, when charged therein, wherein such material may be disintegrated or partly so, and leached or partly so, before it descends toward the bottom of the tank.

With these and other objects in view my invention comprises novel details of improvement and combinations of parts that will be more fully hereinafter set forth and then pointed out in the claims.

Reference is to be had to the accompanying drawings forming part hereof, wherein, Figure 1 is a partly sectional side elevation of a leaching tank embodying my invention;

Fig. 2 is a horizontal section substantially on the line 2—2 in Fig. 1;

Fig. 3 is a horizontal section substantially on the line 3—3 in Fig. 1;

Fig. 4 is a similar section substantially on the line 4—4 in Fig. 1, and

Fig. 5 is an enlarged detail section of the filter chamber or apex extension of the tank.

Similar numerals of reference indicate corresponding parts in the several views.

The tank or vessel I have illustrated may be made of metal or other suitable material, and is shown comprising, mainly, a central or main body portion 1, having an upper top or cover portion 2, and a lower filtering portion or section 3, which may be secured together in any suitable manner, as by rivets 4 securing flanges of said parts. Said portions of the tank may be annular or of any other suitable shape, and the upper portion of the tank is shown provided with a charging opening 5, which may be closed when required by a cover $2^a$ secured thereon in any suitable manner, as in the nature of a manhole cover. I have shown the upper portion of the tank provided with a pipe 6 having controlling valve 7 which may be in communication with an enlarged pipe 8, preferably of wood or non-corrosive material, for a purpose hereinafter explained. The lower portion or section 3 of the tank is preferably in conical form, such as in the shape of a frustum of an inverted cone or pyramid, having a lower discharge opening or outlet at 9 of suitable area. The lower portion or section 3 of the tank is adapted to retain disintegrated and settled raw material to be leached, and I provide means to blow or force under pressure suitable fluid, such as air or other gas, or water, into and through such settled material from below, as well as to drain or draw off solution in the tank through such settled material, which will then act as a filter medium, and whereby fluid pressure or vacuum may be applied within the tank to force or draw leaching agent through the raw material in the tank in either direction. By preference, I provide the lower portion 3 of the tank with filtering means for the solution, through which the solution made in the tank may be filtered, and through which such pressure or vacuum may operate. In the example illustrated in the accompanying drawings, the lower portion 3 of the tank is suitably perforated, as at 10, and against such perforated portion of the tank I apply suitable filtering material at 11, such as a filter cloth, felt, matting or the like. I have illustrated the filtering material 11 as laid against the inner surface of the tank section 3 to bear against the wall thereof, and to retain said filtering medium in position and to protect it against abrasion from the raw material in the tank, I provide a protector 12 having suitable perforations 13. The protector 12 is removable and so arranged that filter medium 11 may readily be removed, cleansed and replaced. The perforated protector 13 may comprise relatively thick sheet metal preferably roughened on one side, similar to steel "deep-diamond" pattern floor plates, and by preference the rough side of the sheet will rest against the filter material 11 and the smooth side will provide the working bottom of such portion of the tank. The filter material 11 may comprise several layers to form what may be termed a filter mattress. I have shown a space or chamber 15 located outside of the area of the filter medium 11, and inclosing the perforations 10 of section 3 of the tank. Said space or chamber 15 may be formed by means of a suitably shaped cap or shell 16 secured upon the exterior of the lower portion or section 3 of the tank, as by means of rivets 14, into which space or chamber solution may filter through said filtering material 11 from the tank, and fluid pressure in either direction may be forced through the space or chamber 15, or vacuum may be applied in said chamber either from the exterior thereof or from the tank. The cap or shell 16 may be of sufficient dimensions to wholly inclose the perforated portion of section 3 of the tank, or several suitably sized caps or shells 16 may be secured in spaced relation upon the section 3, as illustrated in the accompanying drawings. At 17 is a conduit or pipe for communication with the space or spaces 15 for the flow of filtered solution from the tank, or to supply fluid to the tank, or for the creation of vacuum in the tank, through the space or spaces 15. In the example illustrated, a pipe 18 surrounds section 3 of the tank, and communicates through several branches or nipples 19 with the respective spaces or chambers 15. A valve 20 may control the flow through pipe 17 as described.

The passage or outlet 9 of the tank may be closed in any suitable manner, such as by a bottom plate 21 attached to section 3 and provided with an outlet pipe 21ª, preferably having a suitable valve at 22. I preferably provide a filtering chamber, or what I term an "apex extension" of the tank, indicated generally at 23, secured to the bottom flange 3ª of section 3, and to which the plate 21 may be attached. I have shown an apertured plate 24 secured to said flange, a ring 3ᵇ being shown interposed between plate 24 and flange 3ª and riveted to the latter. The chamber or apex extension 23 is also secured to said flange. Bolts 25 detachably secure the parts 3ª, 3ᵇ and 24 together. The chamber or apex extension 23 I have shown in the form of a filter provided with an exterior space 26 connected with a pipe 27 having a valve 28. In the example illustrated the chamber or apex extension 23 is provided with an outer wall or shell 26ª and with an inner perforated wall or shell 30 spaced therefrom to provide the space or chamber 26, and at 29 is filtering material, such as a filter cloth, felt, matting or the like. I have shown the filtering material 29 retained in place by a perforated wall or shell 28 within material 29. The outer wall 26ª is shown attached to a ring or flange 26ᵇ to which the plate 21 may be bolted, as by bolts 26ᶜ. The wall 26ª may be detachably secured to plate 24 and to ring or flange 26ᵇ by means of screws *a*. The perforated walls 28 and 30 and the interposed filter material 29 are shown detachably secured in the filter chamber or apex extension by means of rings *b*, *c*, to which said walls are shown secured by screws *d*, *e*, passing through corresponding flanges 28ª, 30ª at the ends of said walls. When plate 21 is removed the walls 28, 30 and filter material 29 together with the rings *b* and *c* may drop out as a unit, and thereby ready replacement of the filter material may be effected. The rings *b* and *c* are shown fitted against the adjacent flange 3ᵇ and plate 21 and within the rings or plates 24 and 26ᵇ, whereby the walls 28 and 30 are retained in proper operative position respecting the outlet 9.

The raw material to be leached may be charged into the tank through the top opening thereof, either before or after the leaching agent is charged in the tank, or simultaneously therewith. It is preferable to charge the material into the tank after the same is filled or partly so with leaching agent, to prevent damage to the sides and bottom of the tanks when raw material, such as "caliche," falls or is dumped into the same. Caliche may be charged into the tank in pieces or chunks of the size which is ordinarily delivered from the mines, which ranges from nearly dust-like particles to blocks conveniently handled by laborers, and of irregular shapes. To further decrease the danger of such damage to the tank and to prevent large blocks of the raw material from accumulating in the bottom of the tank, one or more retaining nets 34 may be suspended across the tank, preferably near its upper part. The net 34 may be suspended at several points of its perimeter by means of hooks or the like 35 on the sides of the tank, or in any other suitable manner. By preference several such nets 34 may be suspended one below the other, and they may be of any desired size and mesh, but when in series one above the other the coarsest or largest mesh net is preferably placed at the highest level and the mesh of the other nets will decrease in proportion downwardly with respect to the nets so suspended and material to be intercepted. When one net only is used it is preferably so located that it will be at the lower level of the topmost layer of fine products of disintegration resulting from a complete charge, its agitation and settling, as explained hereinafter, and when several of such nets are suspended in a tank the lowermost one preferably will be suspended in manner described regarding the first named net. By means of the net or nets referred to, when the raw material is dumped into the tank it will drop upon the top net, and in accordance with the size of the mesh thereof and the size of the particles or lumps of the raw material they will descend into the tank, different sized lumps being temporarily caught upon the nets of different mesh, and the finer particles passing through all of the nets.

To automatically cause movement of the nets when a plurality thereof are suspended in a tank ropes 36 may be attached to the nets passing through overhead pulleys 37, shown carried by the upper section 2 of the tank, the ends of which ropes are connected respectively to two different nets, as illustrated in Fig. 1, whereby when the raw material is charged upon the top net, it will be moved thereby and will cause movement of the net or nets connected therewith, therebelow, and so on with respect to the different nets, each upper one of which is connected by a rope with a net below it. As the raw material retained upon the nets disintegrates and becomes leached, the weight upon the nets will change and cause movement one by another, having a tendency to cause disturbance of deposited raw material on the nets and thereby assist disintegration, causing material to drop through the meshes of the nets.

At 38 I have illustrated ropes or strands, either long or short, suspended from net 34 to extend into the raw material in the tank. The strands, as well as the net 34 that may be immersed in the upper layer or layers of finer material will cause such finer material to separate or part when and as the tank is drained, forming passages or seep-holes in solids which might then compact somewhat, through which passages or seep-holes the liquid may be forced or drained, thereby avoiding the natural formation of a layer possibly impervious to liquid and air on top of lower heavier coarser, yet porous, settled material. Such action will take place especially when the final last draining of the tank is done under pressure, though less so during intermediate partial drainage during intermittent agitation and draining. At 39, 40 valve controlled inlets or pipes are shown attached to the upper portion of the tank, which are preferably located adjacent to or between the nets, whereby air or water or both may be blown under pressure into the tank at the upper portion of the charge to agitate the same and to aid in disintegration of the raw material and leaching of the salts therefrom. By blowing fluid under pressure against raw material upon a net or nets, such raw material will be moved about, whereby attrition of the raw material will also aid in its disintegration. At 41 the tank is shown provided with a valve controlled pipe located below the normal level of the leaching agent or solution, whereby air or water or both may be blown into the tank and through the charge therein for agitating and aerating the solution or charge, and through which pipe the leaching agent or resulting solution may be forced or drawn from the tank above settled or partly settled solids. The tank may also be provided with any other desired equipment useful for observing the leaching operation, such as a water gage at 42 to indicate the height of the charge or solution, a safety valve 43, and a pressure or vacuum gage at 44, and with bleed cocks, air escapes, etc., as may be found desirable.

While my improvements may be utilized for the leaching of any appropriate raw material, and for the filtration of solutions from such material, I will first describe my invention in connection with the leaching of caliche, or similar material. Caliche is a local name by which certain raw material found mainly in the Republic of Chile, S. A., is there named, and which carries the valuable salts sodium nitrate and chlorid in commercial quantities with some potassium and other salts; my improved leaching tank being particularly applicable to the economical and efficient leaching of desired salts, such as sodium and potassium chlorids and nitrates from caliche. The operation preferably will be started by charging the tank, to a suitable extent, with a desired leaching agent or solution, such as water, and then the raw material (such as suitably broken caliche) will be charged through the top opening into the tank. Such raw material will be opposed by the leaching agent to prevent its sudden dropping upon the bottom of the tank, and where the net or nets 34 is or are provided the larger lumps of caliche or raw material will rest thereon during partial disintegration. The raw material will mix with the leaching agent and salts will thereby be leached out of the raw material forming a solution of such salts. In order to aid in disintegration of the raw material and to aerate the solution to cause oxidation of certain compounds that may be present therein, the charge may be agitated by forcing air into the tank through the pipe $21^a$ and thence upwardly through the charge and continually through raw material deposited or depositing therein. Such air may be forced into the tank through any or all of the inlets. If the leaching agent charged into the tank to receive the raw material has not been of sufficient volume for the final charge desired, more leaching agent may be forced under pressure into the tank through any of the aforesaid inlets, preferably through the lower one or ones, to aid in agitation of the charge and to add solution thereto. Air or water may be forced, when desired, into the tank through pipe $21^a$, and thence through the apex extension 23, thus agitating the entire charge in the tank from the bottom upwardly. The air forced into the tank will find its outlet through pipe 6. Such agitation of the charge by forcing fluid into and through the same may be of long or short duration, and of such degree of violence as desired. After the desired agitation has been secured the contents of the tank may be allowed to settle for a relatively short time. If the solution resulting from the first agitation which may occur with rich fresh caliche, is a saturated solution, it may be drawn or forced off and disposed of as such. In such case a nearly like quantity of fresh leaching agent after said solution is drawn off may be again charged in the tank, agitation being resorted to while this is being done, and thereafter for any desired time. When the originally supplied coarse caliche has been leached and disintegrated sufficient to fall through the net or nets more caliche may be added. If the originally supplied caliche has been sufficiently disintegrated by the first agitation, though the solution may have remained undersaturated, then more caliche may be added if required for the full capacity of the tank, while the agitation is continued. As the tank may not well be completely charged with caliche, in its coarse irregular size, due to retention on retaining nets, in one operation, full charging may be secured by several partial chargings, as above. The leaching agent may be supplied to full capacity on the first charging. An excess of leaching agent when charging caliche is advantageous because it facilitates more violent agitation and disintegration of caliche by compressed air. The first charged leaching agent to which a charge of raw material is added may be pure or ordinary water, or a partly saturated solution. Whenever the solution contained in the tank has become saturated it should be withdrawn, entirely or in part, and such withdrawn quantity may be replaced by an under-saturated solution or pure or ordinary water as the case may require, for further leaching of remaining material. The addition of raw material or fresh leaching agent, or both, may be resorted to according to requirements, for obtaining the desired quality of solution. When the desired solution has been obtained it will be drained through the raw material that has settled in the tank, which material then serves as a filtering medium. For such purpose valve 20 may be opened and the solution will drain through the perforated walls and the filter medium 11 through the space or spaces 15. When the apex extension 23 is used, valve 28 may be opened to cause draining of the solution through the settled raw material, in all parts of the tank, as well as through the filtering material 29. It will be obvious that draining and filtering of the solution may occur through both of the pipes 17 and 27 at the same time. If chamber or apex extension 23 is charged with sand or gravel as a filter medium, the solution draining therethrough will have been drained and filtered through the deposited material upon such sand or gravel, and such sand or gravel may be used for the filtering and draining of successive charges, since said chamber or apex extension may be removed each time the tank is to be entirely emptied, and then replaced and by this means saving, the sand or gravel as a filter medium if specially to be supplied, is effected. When a solution has been drained and filtered, as described, air pressure through any one of the upper inlets may be supplied in the tank, or vacuum may be applied through either or both of the passages 17 and 27 to cause final draining and filtering of solution that may have remained in the voids in the deposited or settled raw material. By filtering the solution through the deposited raw material, particles in suspension in the solution and other undesired substances, will be retained in the deposited material, and salts that otherwise would remain in such material are drained off and saved with the solution, thus avoiding waste of such salts, as well as of fluid.

When a charge thus has been leached and the solution therefrom has been drained and filtered, the finest, most detrimental constituents of caliche, of a sticky, clayey nature, hardest to leach, are successfully leached and settled at least expense. Time is also saved as filtering can be done immediately after suspension of agitation if desired.

while fairly clear settling of the solution would require not less than from 30 to 60 minutes for each clear settling.

While my improvements afford means for a most desirable leaching of caliche, aided by pressure or vacuum or both, it will be understood that the leaching may be carried out in the open with the cover 6 removed. The pipe 8 made of wood or other non-corrosive material, into which the air passes from the tank by preference, during agitation, serves to condense excess moisture carried by escaping air, enabling the use for leaching of the water so regained, and recovery of salts therein.

It will be understood that my invention is adapted to permit cold leaching of caliche or other desired raw material, and by the term "cold" I mean that the leaching agent and material are at the ordinary normal temperature. It will be understood, however, that hot or warm water may be used for the leaching if desired. Also that hot fluids may be forced into the tank. Another advantage is that pure or other water or partly saturated solutions may be charged into the tank containing raw material at any degree of saturation, in a most convenient manner, as well as the ability to separate or remove from the tank all desired solution, whether saturated or not, without removing solids, when desired, permitting the separate storing of different liquids, such as saturated and undersaturated solutions, and while so removing the liquid from the tank to cause filtration thereof, through a filter naturally formed during the process of settlement after agitation and disintegration of raw material, as well as through the improved filtering devices as set forth.

My invention permits the recovering of all remaining unleached particles of caliche if desired, as well as the maximum possible recovery of all liquid used in the leaching process, and the recovery of all vapors of supersaturation carried by the air after agitation through condensation of excess humidity as well as unintentionally blown out liquid in pipe 8. The inclined conical or pyramidal form of the lower part of the leaching tank permits of easy emptying of the leached material through the large opening 9, as well as through the large opening at the bottom of chamber or apex extension 23 when the latter is used. Also, when apex extension 23 is removed bodily to expose opening 9. After the proper degree of leaching and draining has been secured the tank may be emptied of all remaining solids. Among these may be found intact not disintegrated and unleached larger pieces of caliche which may be collected to be ground, in any wellknown manner and later returned to the tank to be leached effectively. While my improved caliche tanks may be installed and operated singly they are adapted for efficient and economical operation in batteries of say six such tanks, or as many as may be desired, and more than one set of such batteries may be installed. The number of batteries, as well as the units of each, will be decided according to the desired capacity of the plant and by considering the kind and class of caliche available. One of the advantages of my invention is that since nearly all classes of caliche, except only the "hard pan" rich in clay, will slowly disintegrate in standing water, and readily in running water, I am enabled to agitate the charge of caliche in water by means of compressed air, whereby water and air currents are forced through the charge, by which means friction or attrition of pieces of caliche against one another will occur, during agitation, and will materially facilitate disintegration. Pieces not thus disintegrated may be recovered to be treated, as before mentioned, by further leaching, and a virtually complete leaching of all caliche may be attained under a minimum of expense of crushing and grinding without requiring the use of heat for the leaching, and without first crushing or grinding all of the raw caliche to be leached and as now practised.

While I have specifically described my improvements as adapted for the disintegration, agitation, leaching, settling, filtering and draining of caliche, it will be understood that my improvements may be used for the leaching of other compounds soluble in any desired liquid, hot or cold, wherein some or all of the steps I have referred to may be utilized, as well as the filtering of liquids for clarification purposes. It also will be understood that changes may be made in the details of construction and relative arrangements of parts set forth, within the scope of the appended claims, without departing from the spirit of my invention.

Having now described my invention what I claim is:—

1. A tank having filtering means located along a lower side wall in communication with the interior of the tank, spaced chambers on said wall without said filtering means, a pipe communicating with each of said chambers, and a valve controlled conduit communicating with said pipe.

2. A tank having spaced series of perforations in a lower side wall, filtering material opposing said perforations, a perforated wall opposing said filtering material, spaced chambers upon the first named wall without the perforations thereof, and a conduit communicating with said chambers.

3. A tank having a lower perforated wall in the form of the frustum of a cone provided with a lower outlet, filtering material opposing said perforations, spaced chambers on the wall without the corresponding perforations thereof, and a conduit communicating with said chambers.

4. A tank having a lower perforated wall in the form of the frustum of a cone provided with a lower outlet, filtering material opposing said perforations, spaced shells secured upon the exterior of the wall over corresponding perforations thereof providing chambers communicating with said perforations, and a conduit communicating with said chambers.

5. A tank having a lower outlet, a filtering chamber having an outer wall, opposing rings within said wall, spaced perforated walls between and secured to said rings respectively and spaced from the first named wall, filtering material between the perforated walls, a conduit communicating with the space between the outer and inner walls, and means to removably secure said filtering chamber to said tank.

6. A tank having a lower outlet, a filtering chamber having an outer wall, opposing rings within said wall, spaced perforated walls between and secured to said rings respectively and spaced from the first named wall, filtering material between the perforated walls, a conduit communicating with the space between the outer and inner walls, means to removably secure said filtering chamber to said tank, and a conduit communicating with the space within the filtering material.

7. A tank having a lower outlet, a filtering chamber comprising spaced apertured plates, a wall secured between said plates, spaced perforated walls within and spaced from the first named wall providing a space therebetween, filtering material between said perforated walls, the inner perforated wall communicating with the outlet of the tank, a conduit communicating with said space, a plate secured below said walls, and means to removably secure the filtering chamber to the tank.

8. A tank having a lower outlet, a filtering chamber comprising spaced apertured plates, a wall secured between said plates, spaced perforated walls within and spaced from the first named wall providing a space therebetween, filtering material between said perforated walls, the inner perforated wall communicating with the outlet of the tank, a conduit communicating with said space, a plate secured below said walls, a conduit communicating with the space within the filtering material, and means to removably secure said filtering chamber to said tank.

9. A leaching tank having a flexible net movably suspended therein to receive raw material deposited in the tank, and one or more flexible strands depending from the net.

10. A leaching tank having a plurality of nets suspended therein and spaced one above another to receive raw material deposited in the tank, means connecting said nets to cause movement of one by another, and one or more flexible strands depending from one of said nets.

11. A leaching tank having a plurality of nets suspended therein and spaced one above another to receive raw material deposited in the tank, and means connecting said nets to cause movement of one by another.

12. A leaching tank having a plurality of nets suspended therein and spaced one above another to receive raw material deposited in the tank, a rope connected with two such nets and movably supported within the tank to cause movement of one net by another.

13. A leaching filtering tank having filtering material at its lower part, a conduit communicating with said filtering material to permit the exit of filter liquid in one direction, and to permit the flow of fluid through the filtering material in another direction under pressure, an upper outlet communicating with the tank, and condensing means communicating with said outlet.

Signed at New York city, in the county of New York, and State of New York, this 29th day of March, A. D. 1917.

WILLIAM E. GIESECKE.

Witness:
T. F. BOURN.